United States Patent [19]

Hara et al.

[11] Patent Number: 5,346,657
[45] Date of Patent: Sep. 13, 1994

[54] INJECTION MOLDING METHOD USING A PLURALITY OF CONTROL PARAMETERS

[75] Inventors: Hitoshi Hara, Funabashi; Toru Okuda, Nara, both of Japan

[73] Assignee: Sumitomo Heavy Industries, Ltd., Tokyo, Japan

[21] Appl. No.: 53,651

[22] Filed: Apr. 29, 1993

[30] Foreign Application Priority Data

May 8, 1992 [JP] Japan .................. 4-142015

[51] Int. Cl.$^5$ ........................... B29C 45/76
[52] U.S. Cl. .................. 264/40.1; 264/40.5; 425/145; 425/149; 425/150
[58] Field of Search .............. 264/40.1, 40.5; 425/145, 150, 156, 160

[56] References Cited

U.S. PATENT DOCUMENTS

| | | | |
|---|---|---|---|
| 3,976,415 | 8/1976 | Hauser et al. | 425/145 |
| 4,325,896 | 4/1982 | Rodgers, Jr. | 264/40.1 |
| 4,767,300 | 8/1988 | Buja et al. | 425/145 |
| 5,057,255 | 10/1991 | Sato et al. | 425/145 |
| 5,059,364 | 10/1991 | Okubo et al. | 264/40.1 |

Primary Examiner—Jill L. Heitbrink
Attorney, Agent, or Firm—Nikaido Marmelstein Murray & Oram

[57] ABSTRACT

An injection molding method using an injection molding machine in which a plurality of control parameters including the injection speed, injection pressure and the mold opening degree are controlled, from a moment immediately before filling up of the mold cavity with the resin, setting the parameters in an order determined in accordance with the characteristics demanded by the resin, such that, when the injection pressure is controlled as a commanding parameter, the injection speed is controlled as a subordinate parameter under a given restriction and, when the mold opening degree is controlled as the commanding parameter, the injection pressure is controlled as a subordinate parameter under a given restriction. According to this method, it is possible to control the injection molding operation on the basis of a plurality of control parameters in accordance with characteristics demanded by the resin in the mold which varies time to time, thus making it possible to maximize the packing degree while minimizing burrs and short shot.

4 Claims, 3 Drawing Sheets

INJECTION MOLDING METHOD USING A PLURALITY OF CONTROL PARAMETERS

BACKGROUND OF THE INVENTION

1. Field of the Invention

The present invention relates to an injection molding method for molding an article by means of an injection molding machine.

2. Description of the Related Art

Conventional injection molding method adopts such a control as to reduce the injection speed immediately before the mold cavity is filled up and to switch the pressure from the injection pressure to the dwell pressure in response to a signal indicative of the filling up of the mold cavity. Such signals indicative of the filling up of the mold cavity is, for example, a signal indicative of the screw position, a signal indicative of the injection load pressure, a signal indicative of the internal pressure of the runner or cavity or a signal representing the degree of opening of the mold. Alternatively, the injection pressure is adjusted in accordance with the degree of opening of the mold in the dwell pressure application stage of the molding process. Thus, the control of the injection pressure has been done based upon a single factor, although the resin exhibits a complicated behavior immediately before and after the filling up of the mold cavity. Consequently, it has been impossible to simultaneously eliminate defects such as burrs, short shot and sink marks to a satisfactory level.

Referring to FIG. 2, the conventional injection molding method essentially required a wait time in which the filling is continued at a very small rate (low-speed filling mode) under a pressure which is low enough to avoid generation of burrs (see FIG. 4) until the gases in the gas space 11 in the mold cavity 6 are completely replaced with the resin. It is also to be understood that a too early reduction of the pressure from the primary injection pressure or a too early switching to the low-speed filling mode tends to cause a short shot due to increase in the viscosity of the resin at the thin-walled portion 12. In other words, it is not allowed to conduct the reduction in the injection pressure or switching to the low-speed filling mode too early before the filling up of the mold cavity.

When the mold has a plurality of mold cavities as shown in FIG. 3, there may remain a cavity or cavities 6a experiencing a short shot 13 even after other cavities 6a have been filled up. A long wait time is required until the short shot in each such cavity or cavities 6a is completely filled, because such filling has to be done at a pressure low enough to avoid generation of burrs in the cavities 6a which have been completely filled.

Referring to FIGS. 1, 2 and 4, when the mold cavity has been completely filled, the resin has been compressed so that the resin tends to flow back towards the screw 16, as indicated by arrows in FIG. 4. In other words, a reaction force is applied to the screw 16. This phenomenon is often observed when the mode has been switched to the dwell pressure mode. Such reversing of the resin, once it has occurred, makes it difficult to completely fill thin-wall portions of the mold cavity and tends to cause defects such as short shot 13 or sink mark 14. It is therefore necessary to take suitable measure for preventing reverse flow of the resin which is allowed by backward movement of the screw 16.

FIG. 4 shows the state of the resin which has filled up the mold cavity but no shell or solidified surface layer has been formed yet at the resin surface contacting the mold wall, while FIG. 5 shows the state in which the solidified surface layer 10 has been formed. The solidified surface layer 10 starts to be produced from 0.1 to 0.2 second after the state shown in FIG. 4 has been attained. Therefore, possible degree packing, i.e., degree of press-filling, of the resin increases in accordance with the increase in the thickness of the solidified surface layer 10.

SUMMARY OF THE INVENTION

Accordingly, an object of the present invention is to provide a control method in which the resin pressure is controlled based upon plural control factors or parameters in accordance with the demanded characteristic of the resin in the mold which varies time to time, so as to attain the greatest degree of press-filling of the resin, while minimizing generation of burrs on the molded article and diminishing the short shot.

To this end, according to the present invention, there is provided an injection molding method for molding an article by using an injection molding machine, in which a plurality of control parameters including the injection speed, injection pressure and the mold opening degree are controlled, from a moment immediately before filling up of the mold cavity with the resin, setting the parameters in an order determined in accordance with the characteristics demanded by the resin, such that, when the injection pressure is controlled as a commanding parameter, the injection speed is controlled as a subordinate parameter under a given restriction and, when the mold opening degree is controlled as the commanding parameter, the injection pressure is controlled as a subordinate parameter under a given restriction.

The control is commenced after the values of one or more of the mold opening degree, screw position and injection pressure have reached predetermined values at a moment immediately before the filling up of the mold cavity.

When the injection pressure is controlled as the commanding parameter, the mold opening degree is set to a value which allows relief of gases but prohibits generation of a burr at the mold parting surface and, after the mold opening degree has reached the set value, the control is switched to a mode which controls, using the set value of the mold opening degree as the control command, the injection pressure as a subordinate parameter under such a restriction that the injection pressure falls within the range which does not allow generation of local burr. Prior to a control of the injection pressure as the commanding parameter, a control is done to control the injection speed and, when a set value of the injection pressure is reached, the control is automatically switched to a mode in which the injection pressure is controlled while the injection speed is controlled as a subordinate parameter such that the resin does not flow backward or such that the absolute value of the speed of backward flow of the resin is smaller than a predetermined maximum allowable value.

According to another aspect of the present invention, there is provided an injection molding method for molding an article by using an injection molding machine, comprising the steps of: commencing, immediately before filling up of the mold cavity with a resin, a control of the injection speed to follow a set value $V_0$ of the injection speed, starting at a control start point which is determined by a set value or values of one or more of control parameters including mold opening degree, screw position and the injection pressure; conducting control of the injection pressure such that the injection pressure is set to a value represented by a set function $P=F(t)$ which provides the maximum injection pressure within a range which does not allow generation of burr and, after the actual injection pressure has been reached the value represented by the set function $P=F(t)$, such that the injection pressure varies in conformity with the set function $P=F(t)$, while restricting the injection speed to a range which does not allow backward flow of the resin or does not cause the absolute value of backward flow speed of resin to exceed a predetermined maximum allowable value, and setting a command mold opening degree to such a value that allows relief of gases but does not allow generation of burr at the mold parting surface; and after the command value of the mold opening degree has been reached, switching the control to a mode in which the injection pressure is controlled so as to maintain the mold opening degree in conformity with the command value, wherein the injection pressure is restricted to a range which does not cause generation of burrs.

These and other objects, features and advantages of the present invention will become clear from the following description which will be taken in conjunction with the accompanying drawings.

DESCRIPTION OF THE PREFERRED EMBODIMENTS

Figure 1:
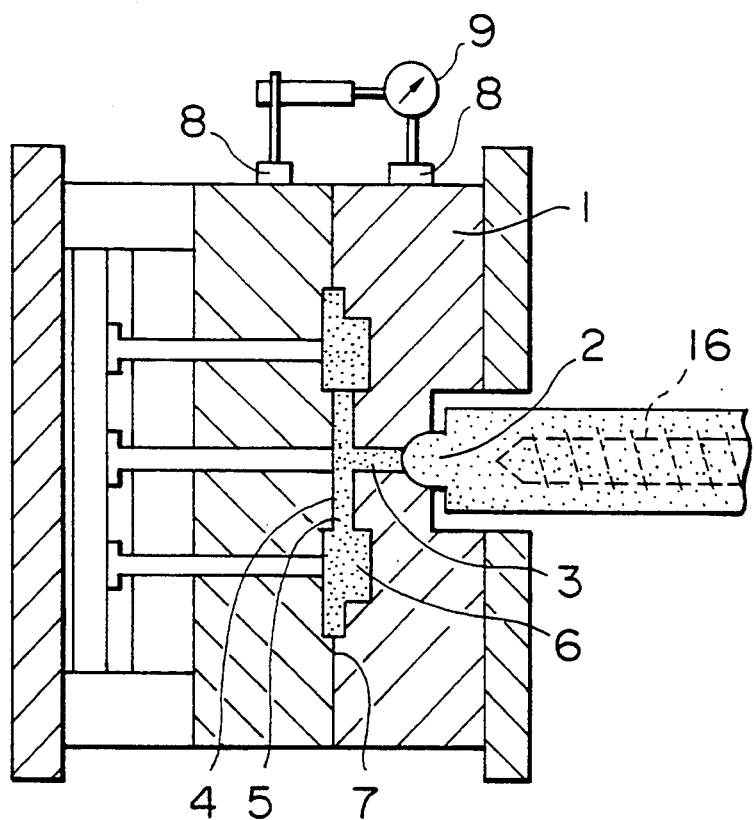
FIG. 1 is a sectional view of an example of a mold employed in an injection molding machine to which the present invention is applied.
Figure 2:
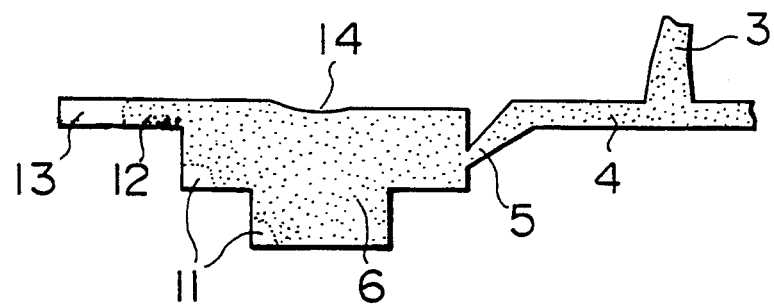
FIG. 2 is a sectional view illustrative of the state of the resin in the mold cavity.
Figure 3:
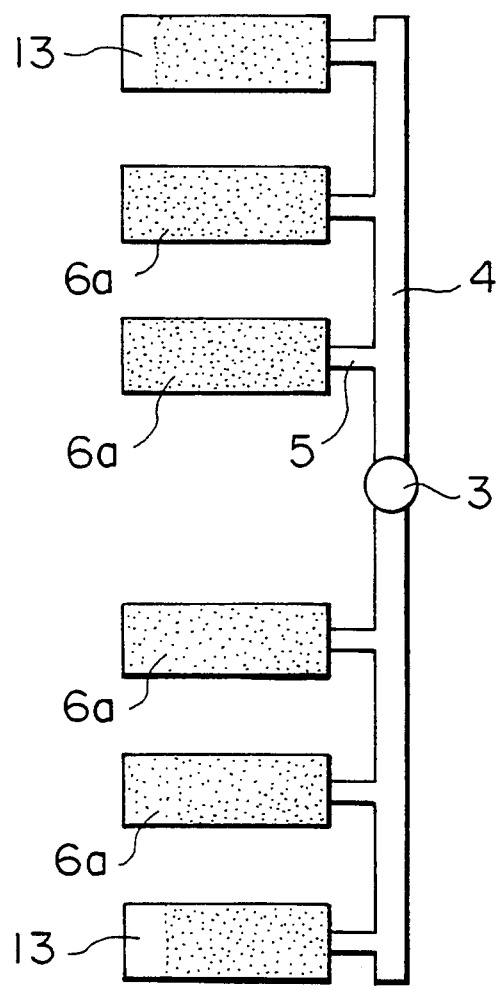
FIG. 3 is a sectional view illustrative of the state of the resin in a mold having a plurality of mold cavities.
Figure 4:
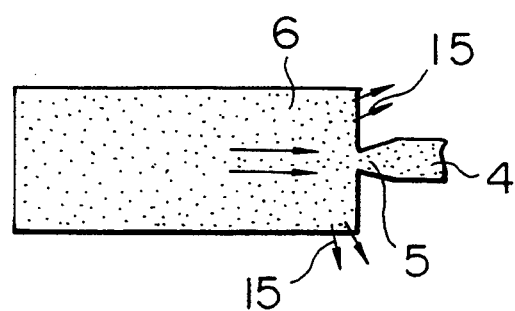
FIG. 4 is a sectional view illustrative of the state of the resin in a mold cavity showing the manner in which burrs are generated.
Figure 5:
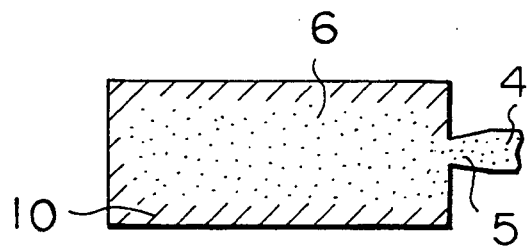
FIG. 5 is a sectional view illustrative of the state in which a solidified surface layer has been formed on the resin in the mold cavity.

Referring to FIG. 1, a molten resin is charged through a nozzle 1 into a mold cavity 6 in a mold 1 via a sprue 3, runner 4 and gates 6 so as to fill the mold cavity 6. When the mold cavity 6 has been filled almost fully, the mold 1 slightly urged backward in the opening direction apart from a mating mold part tending to form a minute gap at the parting surface 7. The amount of this backward movement will be referred to as "degree of opening" of the mold. The degree of opening of the mold is detected by a dial gauge attached to the mold 1 by means of a magnet 8, and is transmitted by a transmitter on the dial gauge 9.

Figure 6:
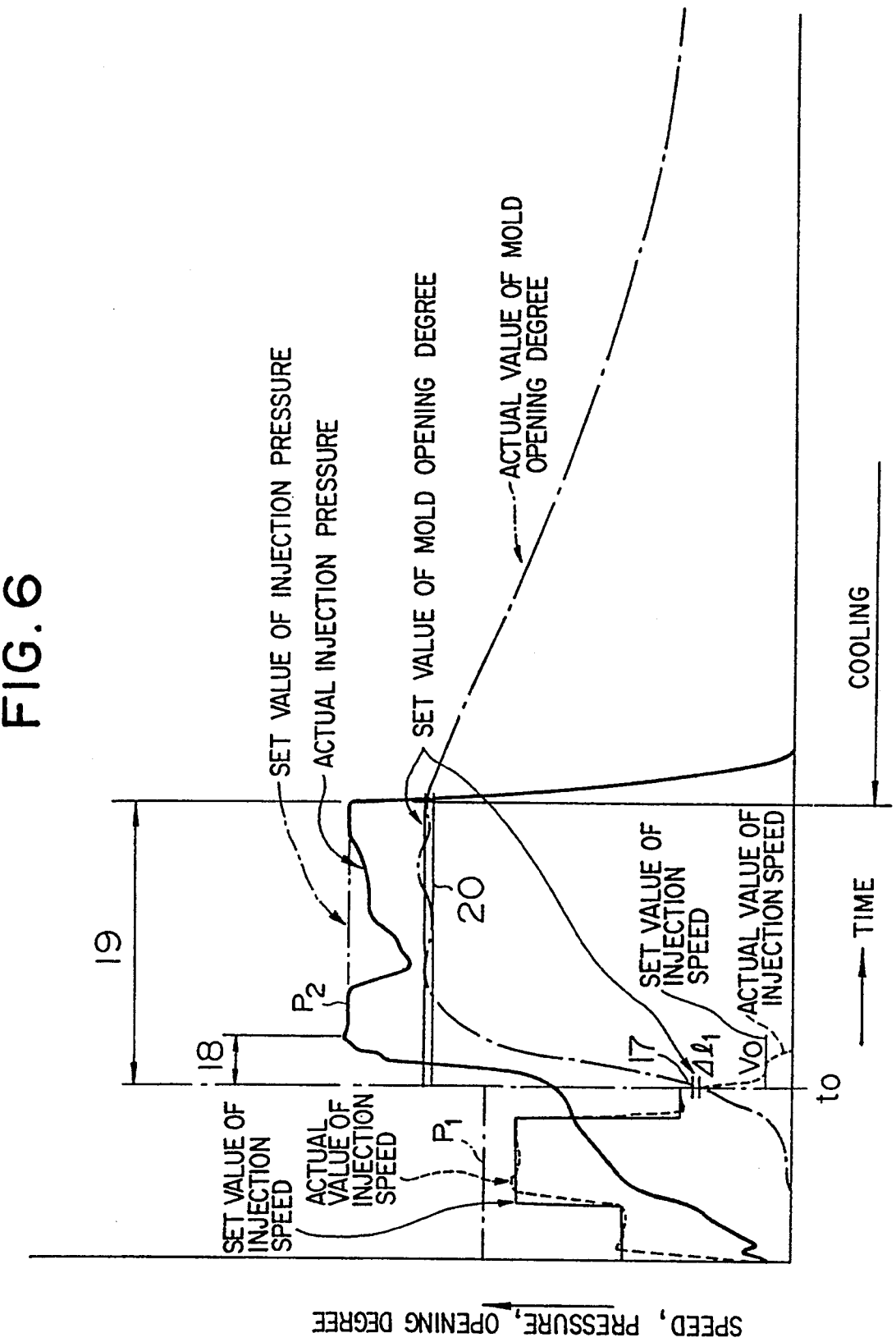
FIG. 6 is a diagram showing how the injection pressure, injection speed and the degree of opening of the mold are changed in relation to time.

Referring now to FIG. 6, a mold opening degree is set as at 17 as a criterion for determination as to whether the cavity 6 has been filled near fully. This set level 17 of the mold opening degree may be replaced with the injection load pressure or the screw position. When this set level of the mold opening degree has been reached, a control is set so as to control the following three factors or parameters:

A) Injection speed (This parameter may be programmed, although it is fixed in the illustrated embodiment.)

B) Injection pressure (This parameter may be programmed, although it is fixed in the illustrated embodiment. In the case of an electric injection molding machine, current value or the motor torque may be used in place of the injection pressure.)

C) Degree of mold opening (This parameter may be programmed, although it is fixed in the illustrated embodiment.)

Referring to FIG. 6, when the degree of mold opening has approached the set level 17 (5 to 10 $\mu$ in case of an ABS resin) after the start of the injection, the injection speed A is feedback controlled on the basis of the set value $A_1$ (10 mm/sec or so in case of ABS resin) of the injection speed. An increase in the load resistance causes a rise in the injection pressure so that the injection pressure reaches a set level $P_1$ (1400 arm in case of injection resin).

When this injection pressure is reached, a feedback control is conducted by using the injection pressure as the commanding parameter, such that the injection pressure is controlled in accordance with a set function of $P=F(t)$, under the conditions of the following formula "S".

O or set value—$A_2$ (3 mm/sec in case of ABS resin) $\leq$ injection speed $\leq$ set value $A_1$ ... S1.

The maximum value Pmax of the injection pressure is 2000 atm.

The maximum allowable injection pressure (pressure which is the highest within the range which does not cause generation of burrs) at a moment $t_0$ immediately before the filling up of the mold cavity is represented by P1, while the maximum allowable injection pressure (pressure which is the highest within the range which does not cause generation of burrs) at a moment at which the solidified surface layer is formed upon contact with the mold wall is expressed by $P_2$. The present inventors have found that the pressure P2 rises in accordance with an increase in the thickness of the solidified surface layer and in accordance with an increase in the viscosity of the resin. In this embodiment, the pressure P2 is changed linearly in accordance with a time value set in a timer 18, e.g., 0.3 second. Obviously, however, other function of time may be used for the control of the pressure. Anyway, the control should follow the curve of the function $P=F(t)$.

In this state, the injection speed naturally falls within the range of the formula S1. Usually, the formula S1 has a value not smaller than 0. The value of this formula, however, may be lowered to a lower limit expressed by -$A_2$, particularly when the mold is so designed and constructed as to small effect in preventing generation of burr. The pressure should not be reduced below this lower limit A2 because a too large backward flowing speed increases the pumping effect on the resin. The maximum pressure Pmax is set to 2000 arm.

An alarm is activated when the range of the formula S1 is exceeded, except for the case of a surge, so that the instant shot is rejected as being defective. With this control, a waiting step is taken until the gases are expelled from the gas space 11 and until any short shot 13 is completely eliminated, while avoiding local generation of burrs.

When the local short shot 13 is completely eliminated, an external pressure acts so as to further open the mold 1 at the parting surface 7 (see FIG. 1). In this state, on conditions that the requirement of the formula S1 and the requirement of the following formula S2 are simultaneously met, the injection pressure is controlled using the mold opening degree as the commanding parameter, such that mold opening degree follows a set value C (30 μ in case of an ABS resin).

injection pressure≦set value Pmax of injection pressure ... $S_2$.

This set value C is determined to be a value which is the greatest within a range which allows escape of gas through the gap on the parting surface but does not allow the resin leak therethrough. In this stage, the thickness of the solidified surface layer 10 of the resin contacting the surface of the mold cavity 5 is still small. Consequently, the degree of possible packing also is small because the thin solidified surface layer of the resin may easily allow generation of burrs when a large degree of packing is effected.

The solidified layer 10 becomes thicker as the time elapses, so that the allowable mold opening degree also is increased. In the illustrated embodiment, the mold opening degree is directly set to C in view of time lag incurred in the control for setting the injection speed and the injection pressure. This value of the mold opening degree C corresponds to the state at which the solidified surface layer 10 is formed. It is thus possible to precisely pack the resin with a degree which is the greatest in the range which does not allow generation of local burrs.

The solidification proceeds to reach the portion near the gate 5 (see FIG. 1). In this state, the injection pressure is no more transmitted to the resin portion inside the cavity 6. Meanwhile, the resin is continuously cooled. The resin constituting the thin-walled portion is primarily quenched and solidified, and this solidification proceeds while pulling or attracting the portion of the resin in the thick-walled portions which are being cooled rather gently. Consequently, sink marks 14 are formed.

In order to suppress the generation of the sink marks, the mold clamping force acts to close the mold when the mold has been opened, thereby uniformly compressing the resin in the mold cavity 6. To enable this operation, the control is conducted while setting the mold opening degree to the maximum value until the timer 19 counts up. If the gate seal occurs too early so that the time set in the timer 19 is too long (when ABS resin is used, the time is set to 4 seconds, although the time varies according to the wall thickness), the mold opening degree becomes smaller than the set value C. Occurrence of such state is informed by a display or activation of an alarm. This function also contributes to the setting of the timer 19. Any shot which has experienced such an abnormal condition is rejected, so that defective products are excluded. This function also contributes to proper setting of the mold clamping force. Obviously, it is possible to automatically correct the mold clamping force, although such a control is omitted in the illustrated embodiment.

When the mold clamping force is too large, the required mold opening degree cannot be obtained even when the injection pressure has been increased to the maximum pressure. Such a condition is informed to the operator through the display or the alarm, so that the operator can readjust the mold clamping pressure. Such readjustment of the mold clamping force may be done automatically. Thus, according to the present invention, it is possible to simultaneously obviate, except for some special cases, the defects such as generation of burrs,- short shot and generation of sink marks which are the common problem of this field of industry.

The degree of mold opening can be measured simply by a position detecting device such as a dial gauge 9 which can easily be mounted on the mold by means of a magnet 8 or the like fixing means, without requiring any modification of the mold construction. Various controls and computations described hereinbefore can be realized without difficulty by using a general-purpose computer program, so that details of such controls and computations are not described in detail in this specification.

For information, in case of ABS resin, the actual value of the mold opening degree is 20 to 35μ as against the set value of the mold opening degree of 5 to 10μ and, in case of nylon, the actual value of the mold opening is 8 to 12μ as against the set value of the mold opening degree of 2 to 4μ for 8 to 12μ.

When the injection molding machine is driven hydraulically, the control of injection speed is achieved by varying the speed of the pump or tilt angle of the swash plate, whereas, when the injection molding machine is driven electrically, the injection speed is controlled by varying the speed of the driving electric motor. The control of the injection pressure is achieved by means of a hydraulic pressure control valve when the injection molding machine is driven electrically and by varying electric current or motor torque control when the injection molding machine is driven electrically.

As has been described, according to the present invention, a plurality of parameters including at least the injection speed, injection pressure and the mold opening degree are controlled in conformity with the set values starting at a moment which is immediately before the filling up of the mold cavity with the resin, the control being done in an order of the parameters determined in accordance with the demanded characteristics of the resin, such that the value of the commanding parameter follows a set value while the value of subordinate parameters meet predetermined conditions. Consequently, the following advantages are brought about by the present invention.

1) It is possible to simultaneously obviate defects such as burrs, short shot and sink marks.
2) A gas relieving effect is achieved by a suitable control of the mold re-opening degree.
3) It is possible to realize a rational molding method with distinctive setting of control parameter values.

What is claimed is:

1. An injection molding method of molding by using an injection molding machine, wherein a plurality of control parameters including an injection speed, an injection pressure and a mold opening degree are controlled from a moment immediately before filling up a mold cavity with resin as commanding parameters in an order determined in accordance with characteristics demanded by the resin to obtain predetermined set values such that when the injection pressure is controlled as the commanding parameter, the injection speed is controlled as a subordinate parameter under a given restriction and, when the mold opening degree is controlled as the commanding parameter, the injection pressure is controlled as a subordinate parameter under a given restriction, comprising injecting resin into a mold cavity wherein immediately before the mold cavity is filled up with said resin and after the mold opening degrees reaches a predetermined set value, the control is switched from a mode in which the injection speed is controlled as the commanding parameter to reach a set value to another mode in which the injection pressure is controlled as the commanding parameter to reach a set value.

2. An injection molding method according to claim 1, wherein, when the injection pressure is controlled as the commanding parameter, the mold opening degree is set to a value which allows relief of gases but prohibits generation of a burr at the mold parting surface and, after the mold opening degree has reached the set value, the control is switched to a mode which controls, using the set value of the mold opening degree as the control command, the injection pressure as a subordinate parameter under such a restriction that the injection pressure falls within the range which does not allow generation of local burr.

3. An injection molding method according to claim 1, wherein, prior to a control of the injection pressure as the commanding parameter, a control is done to control the injection speed and, when a set value of the injection pressure is reached, the control is automatically switched to a mode in which the injection pressure is controlled while the injection speed is controlled as a subordinate parameter such that the resin does not flow backward or such that the absolute value of the speed of backward flow of the resin is smaller than a predetermined maximum allowable value.

4. An injection molding method for molding an article by using an injection molding machine, comprising the steps of:
commencing, immediately before filling up of the mold cavity with a resin, a control of the injection speed to follow a set value $V_0$ of the injection speed, starting at a control start point which is determined by a set value or values of one or more of control parameters including mold opening degree, screw position and the injection pressure;
conducting control of the injection pressure such that the injection pressure is set to a value represented by a set function $P=F(t)$ which provides the maximum injection pressure within a range which does not allow generation of burr and, after the actual injection pressure has been reached the value represented by said set function $P=F(t)$, the injection pressure varies in conformity with said set function $P=F(t)$, while restricting the injection speed to a range which does not allow backward flow of the resin or does not cause the absolute value of backward flow speed of resin to exceed a predetermined maximum allowable value, and setting a command mold opening degree to such a value that allows relief of gases but does not allow generation of burr at the mold parting surface; and
after the command value of the mold opening degree has been reached, switching the control to a mode in which the injection pressure is controlled so as to maintain the mold opening degree in conformity with said command value, wherein the injection pressure is restricted to a range which does not cause generation of burrs.

* * * * *